Dec. 5, 1967  P. P. RUMINSKY ETAL  3,356,112
SCREW STRIP DRIVING GUN

Filed May 25, 1965  3 Sheets-Sheet 1

INVENTORS
PAUL P. RUMINSKY
HERBERT C. BRAUCHLA
BY Semmes & Semmes
ATTORNEYS

Dec. 5, 1967
P. P. RUMINSKY ETAL
3,356,112
SCREW STRIP DRIVING GUN
Filed May 25, 1965
3 Sheets-Sheet 2
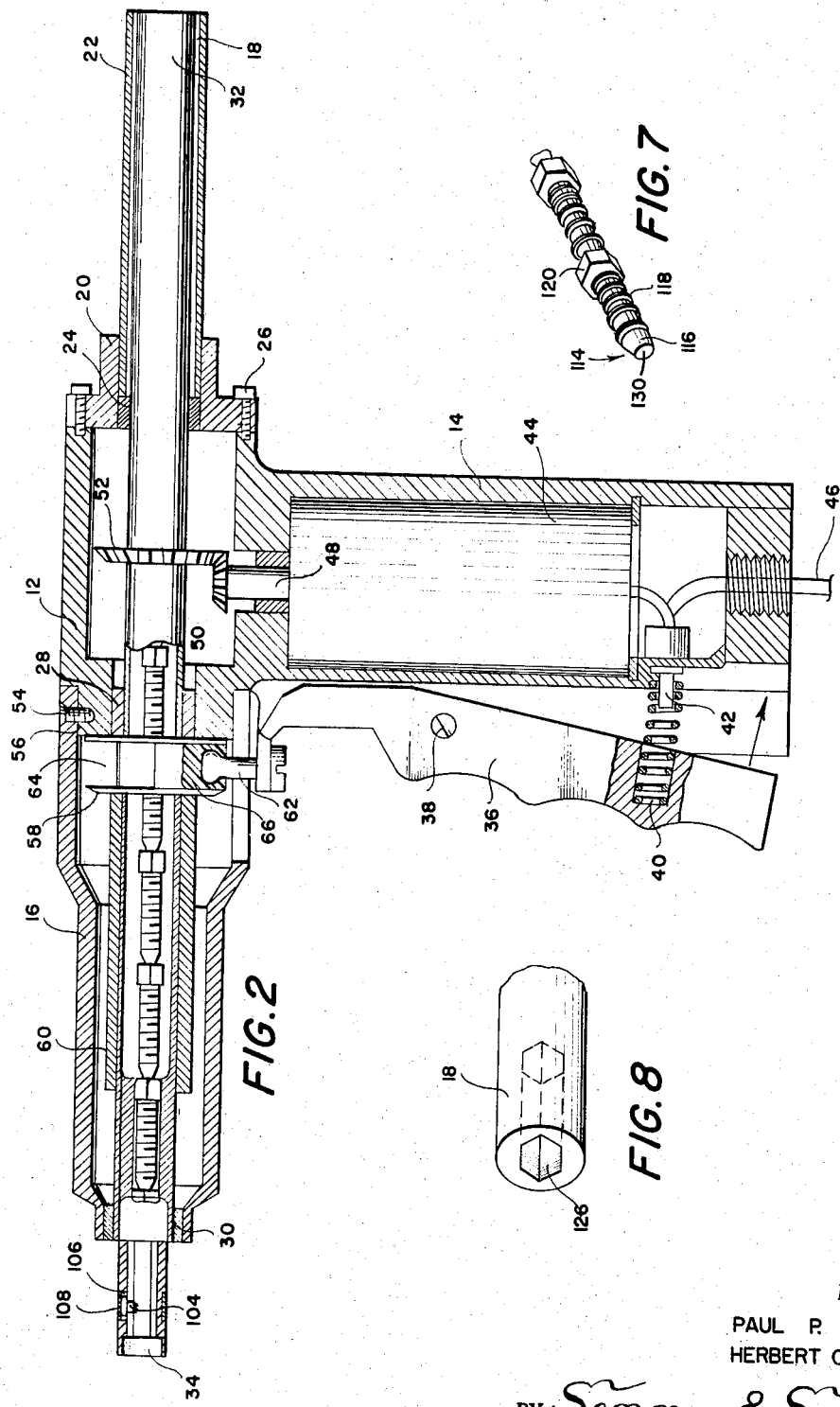
INVENTORS
PAUL P. RUMINSKY
HERBERT C. BRAUCHLA
BY Semmes & Semmes
ATTORNEYS Dec. 5, 1967  P. P. RUMINSKY ETAL  3,356,112
SCREW STRIP DRIVING GUN Filed May 25, 1965  3 Sheets-Sheet 3

INVENTORS
PAUL P. RUMINSKY
HERBERT C. BRAUCHLA
BY Semmes & Semmes
ATTORNEYS

United States Patent Office 3,356,112
Patented Dec. 5, 1967

3,356,112
SCREW STRIP DRIVING GUN
Paul P. Ruminsky, Amherst, and Herbert C. Brauchla,
Fremont, Ohio, assignors, by direct and mesne assignments, of one-half to said Brauchla and one-half to
J. D. Guernsey, Fostoria, Ohio
Filed May 25, 1965, Ser. No. 458,789
6 Claims. (Cl. 144—32)

ABSTRACT OF THE DISCLOSURE

A screw strip driving gun of the type used for driving by rotating a plurality of aligned screws, integrated in end to end relationship as a "screw strip" or "screw stick." Upon rotation of the gun "barrel," the lead screw is rotatably advanced towards the surface being penetrated and as the lead screw head is driven flush with the surface, the screw head is sheared from the succeeding screw.

The present application relates to a screw strip driving gun, particularly an electrically or air-powered gun for the mechanical driving of a plurality of screws integrated as a screw strip in end to end relationship.

Since approximately 1940, numerous screw strip driving guns have been devised for a multiplicity of industrial requirements. For example, the screw strip has been used in camera manufacture wherein the screws are of such diminutive size as to be readily misplaced. More recently, the screw strip driving gun has been devised for the manufacture of washing machines, TV appliances and the like, where the appearance of the screw is secondary to the rapidity of driving and its security when in place. As yet, screw strip driving has not been perfected. The principal difficulty encountered has been in the axial advancing while rotating or driving of the screw strip. Several previous inventors have devised elaborate cam and panel means for locking into the screw strip threads while rotating the screw strips by means of a chuck.

Applicants have found that advancing of the screw strip by engagement with the screw threads is not entirely satisfactory due to the small size of the threads and the difficulty of precision engagement. However, they have found that by attacking the individual screw head rearwardly from opposed sides, the screw strip is readily advanced axially so that the tip of the lead screw is presented to the surface to be penetrated. Accordingly, applicants have provided within their rotating screw strip barrel a pair of opposed apertures wherein spring urged jaws are urged rearwardly onto the individual screw heads, then advanced axially. As the lead screw is driven into the surface to be penetrated, the screw strip is axially advanced a sufficient extent so that the succeeding screw head is stripped beyond these jaws. Then again the jaws are spring urged against the rear of the screwhead and advanced sequentially by squeezing of the screw strips driving gun trigger.

Accordingly, it is an object of invention to provide a reliable screw strip driving gun of simple mechanical construction.

Another object of invention is to provide a screw strip driving gun which effectively advances the screw strip axially.

Another object of invention is to provide a screw strip driving gun having an improved mechanism for engaging the individual screws and advancing them.

Additional objects of invention will become apparent from the ensuing specification and attached drawing wherein:

FIG. 2 is a longitudinal, enlarged section thereof;

Figure 4:
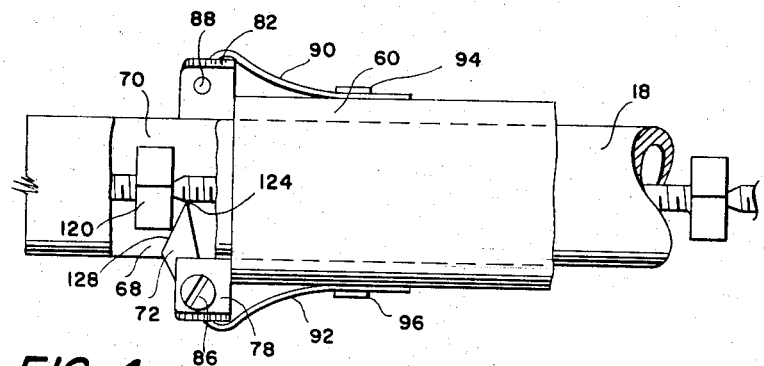
Figure 5:
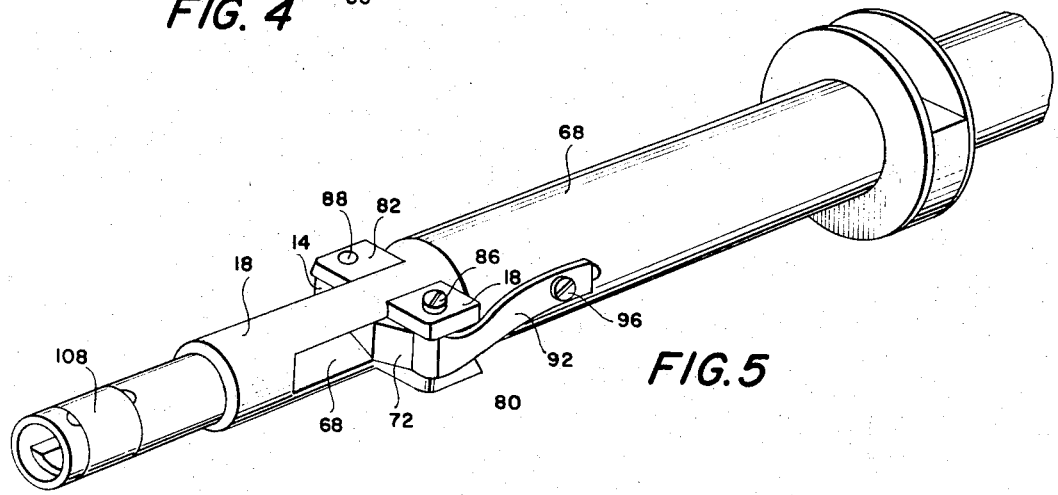
Figure 6:
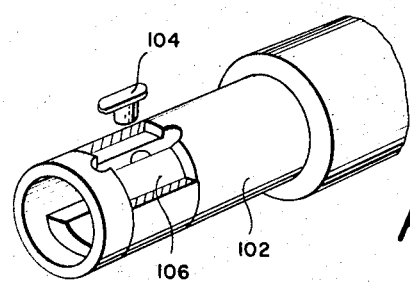

FIG. 4 is a side elevation partially in section showing the engagement of the individual screw strip jaws 72 and 74, engaging the rear of the individual screw head 120;

FIG. 5 is an enlarged perspective showing the screw strip jaws 72 and 74 in attitude of stripping over the screw head 120;

FIG. 6 is an exploded perspective, partially in section, showing the radial, inward positioning of safety lug 104 with respect to the indexing piece 102;

FIG. 7 is an enlarged perspective in fragment showing a screw strip of the type driven in the present gun; and FIG. 8 is a perspective in fragment showing a modification wherein the screw driving barrel driving end has a bore of hexagonal cross-section for engaging hex-headed screws.

Figure 1:
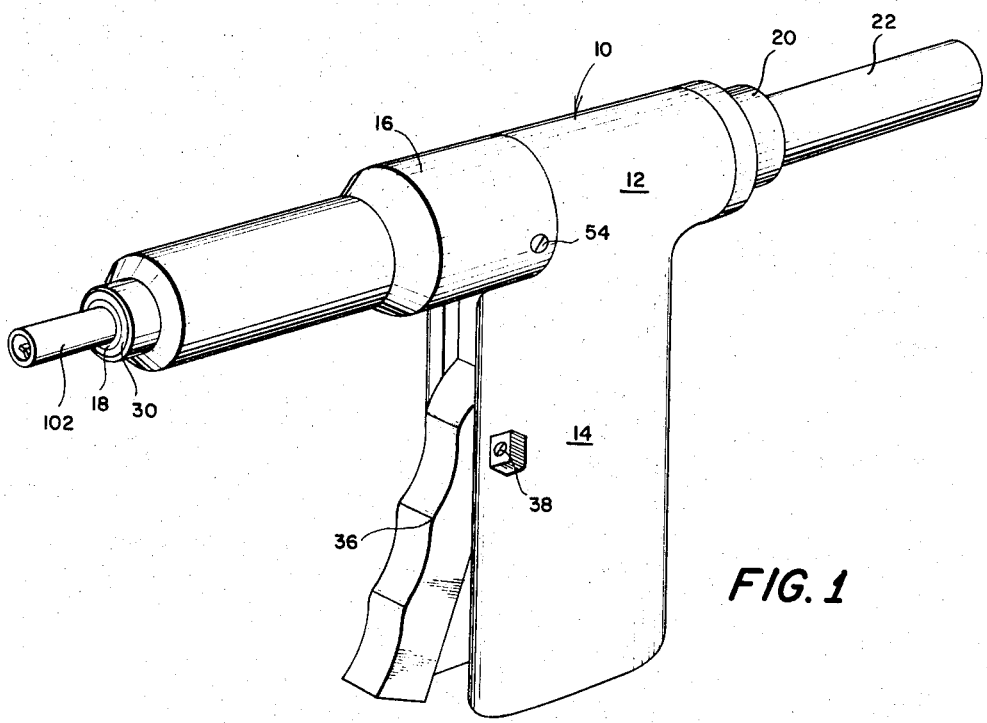
FIG. 1 is a perspective view of the screw strip driving gun.

In FIG. 1 screwdriving gun, generally designated as 10, is shown as comprising an integrally moulded housing 12 and handle 14, a forward support tube 16 being connected to housing 12 by means of set screw 54.

As illustrated in FIG. 2, rotating barrel 18 is mounted within housing 12 by means of rear bushings 24 positioned in rear support piece 20, which in turn is secured to the housing by means of screws 26. The forward end of barrel 18 is mounted in support tube 16 by means of bushings 28 and 30. Support tube 16 may be secured to housing shoulder 56 by means of screw 54. A safety cover 22 may be secured inwardly of support piece 20 to protect the operator against rotation of barrel 18. Barrel 18 is provided with screw strip receiving muzzle 32 and a screw driving end 34 is defined in screw indexing piece 102. Trigger 36 is pivoted to handle 14 by means of bolt 38. Coil spring 40 is secured concentrically of micro limit switch 42 so as to urge trigger 36 outwardly of switch 42 connected to power line 46 and controlling electric or air-powered driving motor 44. Motor 44 in turn drives shaft 48 upon which miter-gear 50 is affixed to engage corresponding miter gear 52 affixed to barrel 18. Advancing sleeve 60 is supported about barrel 18 and has at its rearward end a collar 58 defining track 64 in which may be mounted slip collar 66 fitted about actuation bolt 62 attached to trigger 36.

Figure 3:
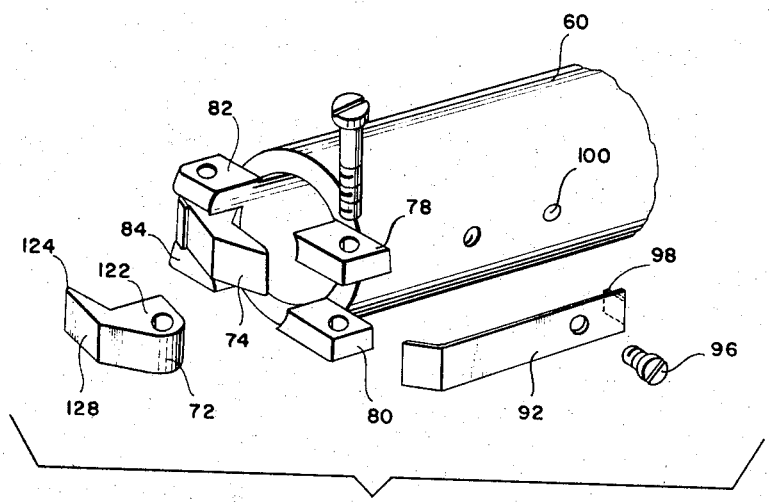
FIG. 3 is an exploded perspective view showing the detail of the pivoted, spring urged screw strip advancing jaws 72 and 74.

Barrel 18, as illustrated in FIGS. 4 and 5, has at its mid-portion opposed apertures 68 and 70. Screw strip locking jaws 72 and 74 are mounted in advancing sleeve 60 by means of opposed upstanding brackets 78, 80, 82 and 84 and bolts 86 and 88. Opposed leaf springs 90 and 92 may be secured on either side of sleeve 60 by means of screws 94 and 96. As particularly illustrated in FIGS. 3 and 5, leaf springs 90 and 92 are bent inwardly as at 98 in order that they may be seated in locking aperture 100.

As illustrated in FIG. 7, screw strip 114 comprises reduced area cross-section lead portion 116, threads 118 and hex-head 120. Applicant Brauchla's Method for Forming Threaded Screws of this type is the subject of a patent application being filed. As particularly illustrated in FIGS. 3 and 4, locking jaws 72 and 74 have a tip 124, a forward bevelled shoulder 128 and an inner flat shoulder 122. Jaws 72 and 74 are pivoted so that upon forward advancement of locking sleeve 60 by means of squeezing trigger 36, shoulders 128 engage the rear of screwhead 120 and simultaneously push from both sides the screwhead axially toward the driving end or muzzle 34. An indexing piece 102 of reduced cross-section provides for indexing of the screw strip in hard to reach places of narrow dimensions and may include a screwhead engaging lug 104. Screwhead engaging lug 104 is urged inwardly through aperture 106 by means of circumferential spring 108 so as to prevent slipping of the strip out of the gun when not in a driving attitude.

In operation, as trigger 36 is squeezed against micro limit switch 42, motor 44 is actuated to drive shaft 48 inducing rotation in barrel 18, while simutlaneously advancing lock sleeve 60 axially. Simultaneously, jaws 72 and 74, forward bevelled shoulders 128 rearwardly engage screwhead 120, advancing the screwhead and the entire screw strip axially toward screw driving end muzzle 34. Rotation of the screw strip is induced, as illustrated in FIG. 8, by means of the hex-headed driving end 126. The inner bore of piece 126 may have rectangular or other configuration to complement and engage a corresponding screw head configuration. As the lead screw protrudes from muzzle 34 and penetrates the surface to be secured, it pulls the entire screw strip axially. As the screw head of the lead screw is secured into the base to be penetrated the lead screw is sheared from the succeeding screw strip at point 130 as illustrated in FIG. 7. The axial advancement of the screw strip caused by the lead screw shank penetrating the surface to be driven, causes the individual screw head 120 next behind locking jaws 72 and 74 to "strip" through these jaws. Jaws 72 and 74 are thus spring-urged to engage the rear of the screw head from opposed sides and in a position for advancement of the entire screw strip as trigger 36 is squeezed.

Then pressure on trigger 36 may be released, driving of barrel 18 and rotation of the screw strip is stopped while spring 40 urges the trigger outwardly so as to retreat sleeve 60 and jaws 72 and 74 for reverse axial movement. Jaws 72 and 74 then strip over the succeeding screwhead 120 and are placed in the attitude illustrated in FIG. 4.

Manifestly, various substitutions of parts may be employed and screws having variously shaped heads may be driven without departing from the spirit and scope of invention, as defined in the subjoined claims.

We claim:

1. A screw strip driving gun of the type having a housing and handle attached thereto, comprising:
   (A) a rotatable barrel extending through said housing, and having a screwdriving end and a screw strip receiving muzzle,
   (B) a driving means supported in said housing and engaging said rotatable barrel;
   (C) screw guide means mounted at the driving end of said barrel and axially supporting a screw strip of threaded screws having heads in end to end relationship within said barrel;
   (D) an axially reciprocable locking sleeve supported about a median portion of said rotatable barrel and including at its forward end a pair of pivoted thread-engaging cams radially extensible through the top and bottom of said rotatable barrel so as to engage rearwardly and from both sides of the heads of said screws upon axial advancement of said locking sleeve; and
   (E) trigger means pivoted in said housing and engaging said locking sleeve which is axially advanceable upon pivoting of said trigger.

2. A screw strip driving gun as in claim 1, including spring means supported upon said locking sleeve and against said cams so as to urge said cams to engage said screw strip heads rearwardly and from both sides.

3. A screw strip driving gun as in claim 2, said screw guide means having at the screwdriving end of said barrel a hex-headed keyhole lock piece equivalent in axial configuration to the vertical sectional profile of said screw strip heads.

4. A screw strip driving gun as in claim 3, including head screw indexing means extending from the screwdriving end of said housing parallel with said screw strip.

5. A screw strip driving gun as in claim 4, including a radially inwardly extending dog spring-positioned in said screw guide means and lockable with said screw strip so as to inhibit axial movement of said screw strip when not driving.

6. A screw strip driving gun as in claim 1, said locking sleeve cams being eccentrically pivoted and shaped so as to engage said screw strip heads rearwardly upon forward axial advancement of said locking sleeve and to strip over said heads upon reverse axial movement of said locking sleeve.

References Cited

UNITED STATES PATENTS 2,506,835   5/1950   Johnson _____ 144—32
2,575,525   11/1951  Mitchell _____ 144—32

WILLIAM W. DYER, JR., *Primary Examiner.*

R. J. ZLOTNIK, *Assistant Examiner.*